(12) United States Patent
Chai

(10) Patent No.: US 11,470,202 B2
(45) Date of Patent: Oct. 11, 2022

(54) CHARGING METHOD, APPARATUS, AND SYSTEM

(71) Applicant: HUAWEI TECHNOLOGIES CO., LTD., Guangdong (CN)

(72) Inventor: Xiaoqian Chai, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 416 days.

(21) Appl. No.: 16/533,448

(22) Filed: Aug. 6, 2019

(65) Prior Publication Data
US 2019/0364153 A1 Nov. 28, 2019

Related U.S. Application Data

(63) Continuation of application No. PCT/CN2017/104543, filed on Sep. 29, 2017.

(30) Foreign Application Priority Data

Feb. 7, 2017 (CN) .......................... 201710068015.5

(51) Int. Cl.
H04W 4/24 (2018.01)
H04M 15/00 (2006.01)
(52) U.S. Cl.
CPC ........... H04M 15/41 (2013.01); H04M 15/64 (2013.01); H04M 15/765 (2013.01); H04M 15/772 (2013.01); H04W 4/24 (2013.01)
(58) Field of Classification Search
CPC .... H04M 15/41; H04M 15/64; H04M 15/765; H04M 15/772; H04M 15/66; H04M 15/65; H04M 15/785; H04M 15/44; H04M 15/77; H04M 15/8228; H04M 15/62; H04W 4/24; H04L 12/1407; H04L 12/1403; H04L 12/14
See application file for complete search history.

(56) References Cited

U.S. PATENT DOCUMENTS 10,986,474 B2 * 4/2021 Li ........................... H04L 12/14
2012/0109800 A1 * 5/2012 Zhou ................... H04M 15/765
705/34

(Continued)

FOREIGN PATENT DOCUMENTS

CN 1773917 A 5/2006
CN 101127741 A 2/2008

(Continued)

OTHER PUBLICATIONS

PCT International Search Report and Written Opinion issued in International Application No. PCT/CN2017/104543 dated Jan. 4, 2018, 17 pages (with English translation).

(Continued)

Primary Examiner — Marcus Hammonds
(74) Attorney, Agent, or Firm — Fish & Richardson P.C.

(57) ABSTRACT

The present disclosure relates to the field of communication technologies. In one example charging method, a gateway manages, by using customer as a granularity, charging information of a plurality of devices of a customer that are currently connected to the gateway, and establishes one customer-level charging session or customer level Charging Data Record (CDR) for each customer.

13 Claims, 9 Drawing Sheets

(56) References Cited

U.S. PATENT DOCUMENTS

2016/0036598 A1* 2/2016 Chai ................... H04M 15/61
                                                    370/259
2016/0072963 A1* 3/2016 Cai ..................... H04L 67/306
                                                    370/259
2016/0373589 A1* 12/2016 Chai ................... H04M 15/64

FOREIGN PATENT DOCUMENTS

| CN | 101227299 A | 7/2008 |
| CN | 101841421 A | 9/2010 |
| CN | 101945368 A | 1/2011 |
| CN | 102045175 A | 5/2011 |
| CN | 104270734 A | 1/2015 |
| CN | 105009613 A | 10/2015 |
| WO | 2011140922 A1 | 11/2011 |

OTHER PUBLICATIONS

Extended European Search Report issued in European Application No. 17895560.5 dated Dec. 4, 2019, 11 pages.

* cited by examiner

CHARGING METHOD, APPARATUS, AND SYSTEM

CROSS-REFERENCE TO RELATED APPLICATIONS

This application is a continuation of International Application No. PCT/CN2017/104543, filed on Sep. 29, 2017, which claims priority to Chinese Patent Application No. 201710068015.5, filed on Feb. 7, 2017. The disclosures of the aforementioned applications are hereby incorporated herein by reference in their entireties.

TECHNICAL FIELD

The present invention relates to the field of communication technologies, and specifically, to a charging method, an apparatus, and a system that are applied to a scenario in which one customer has a plurality of devices.

BACKGROUND

In a communications system, each customer has one or more accounts in a charging system. The account is used for paying for a service on a device of the customer. When a customer has a plurality of devices, services on the plurality of devices of the customer are paid for by using the account. In other words, the plurality of devices share one customer account (account number). In addition, each device of the customer has an independent and unique access number (or identification information or user identifier such as an IMSI), which is used for access authentication, charging information collection, location management, and the like. A current charging mechanism of an operator is: In case of online charging, the communications system creates a charging session for an IP-CAN (IP Connectivity Access Network, IP-connectivity access network) bearer or an IP-CAN session for each device to access a network, and allocates a charging quota. In case of offline charging, the communications system creates a charging data record for an IP-CAN bearer or an IP-CAN session for each device to access a network.

With development of 5G and IoT (Internet of Things) technologies and the like, the communications system is going to meet a full connection era of the Internet of everything. A quantity of connected devices or terminals increases exponentially, leading to a large quantity of scenarios in which one customer has a plurality of devices. According to the current charging mechanism, when a quantity of connections increases rapidly, a quantity of charging sessions and a quantity of charging data records increase exponentially, and each charging session or charging data record may be used to process or may include only a very small amount of charging information of a single device. This causes charging information fragmentation and charging quota fragmentation, and requires high-cost quota management and charging information management. In addition, performance and processing efficiency of a gateway and the charging system are greatly reduced due to a large quantity of charging sessions and charging data records. Therefore, a solution is needed to resolve the following prior-art problems: when a customer has a plurality of devices, charging information and a charging quota are fragmented due to establishment of a charging session or a charging data record for each device, performance of the gateway and the charging system is reduced due to such fragmentation, and so on.

SUMMARY

Embodiments of the present invention describe a charging method, an apparatus, and a system, to avoid charging information fragmentation and charging quota fragmentation when a customer has a plurality of devices, and reduce performance consumption of a gateway and a charging system. Therefore, in the gateway and the charging system, charging information and a charging quota of one customer are easier to maintain.

According to a first aspect, an embodiment of the present invention provides a charging method, which may be applied to a scenario in which a customer has a plurality of devices. In the method, a gateway manages, by using a customer as a granularity, charging information of a plurality of devices of a customer that are currently connected to the gateway, and establishes only one customer-level charging session or customer level CDR (Charging Data Record, charging data record) for each customer. The customer level CD or a message that is used for reporting the charging information of the customer and that is sent in the customer-level charging session includes an identifier of the customer and charging information of one or more devices of the customer. Charging information of each device may be used as one charging information unit, and each charging information unit includes an identifier of the device and the charging information. The charging method provided in this embodiment of the present invention may be applied to a plurality of charging scenarios such as online charging, an offline charging mode based on an RF interface (which means that the gateway performs offline charging by using an RF interface), and an offline charging mode based on a CDR (which means that the gateway generates a CDR to perform offline charging). In this embodiment of the present invention, a connection between the device and the gateway refers to a bearer established between the device and the gateway for transferring service data or a service flow, for example, a PDN (Packet Data Network) connection. The method is described below for different scenarios:

Online charging scenario:

In a possible design, when a device of the customer establishes a connection to the gateway, the gateway determines whether a customer-level charging session of the customer has been established on the gateway currently. If a customer-level charging session of the customer already exists on the gateway, the gateway reports charging information of the device by using the customer-level charging session. If no customer-level charging session of the customer exists on the gateway, the gateway creates a customer-level charging session for the customer. It should be noted that the "customer-level charging session" described in this embodiment of the present invention is a charging session created by the gateway at a customer level granularity. A request for creating the charging session carries a customer identifier. An online charging system identifies, by using the customer identifier, a customer whose charging information is reported in the customer-level charging session. The customer-level charging session may be shared by a plurality of devices of one customer. The gateway reports the charging information of the customer in one customer-level charging session. The message sent by the gateway for reporting the charging information of the customer includes, the identifier of the customer and charging information of one or more devices of the customer that are currently connected to the gateway. According to the solution provided in this embodiment of this application, the gateway needs to maintain, within any time, only one customer-level charging session for one or more devices of one customer that are currently connected to the gateway, thereby reducing maintenance costs of a charging session on a gateway side, reducing network resource consumption, and improving gateway performance. In the customer-level charging session, the gateway may report the charging information of the plurality of devices. In this way, the online charging system obtains, in one charging session, charging information of a plurality of devices of one customer, thereby avoiding collecting and merging charging information in different charging sessions of a plurality of devices of one customer, simplifying processing in the online charging system, and improving processing performance of the online charging system.

In a possible design, when a connection between a device of the customer and the gateway is to be removed, to ensure that a customer-level charging session used by the device can continue to be used by another device of the customer that is currently connected to the gateway, the gateway needs to determine whether the to-be-removed connection is the last connection of the customer to the gateway. If the to-be-removed connection is the last connection of the customer to the gateway, it indicates that there is no other device connected to the gateway, and the customer-level charging session no longer needs to be used. In this case, the gateway removes the customer-level charging session of the customer. If the to-be-removed connection is not the last connection of the customer to the gateway, it indicates that another device of the customer is currently connected to the gateway, and the customer-level charging session further needs to be used. In this case, the gateway reserves the customer-level charging session of the customer.

In the solution provided in this embodiment of the present invention, the charging session is created and maintained at the customer level granularity. That is, a plurality of devices of one customer share one customer-level charging session. In a possible design, similarly, a charging quota and a charging event are also allocated and used at the customer level granularity. That is, a plurality of devices sharing one customer-level charging session share a quota and a charging event. Specifically, after a device of the customer establishes a connection to the gateway, the gateway reuses the customer-level charging session or creates a new customer-level charging session. The gateway determines whether a quota and a charging event have been requested and granted from the online charging system for a rating group to which the device belongs. If no quota and charging event have been requested and granted from the online charging system for the rating group to which the device belongs, the gateway requests a quota for the rating group. If a quota and a charging event have been requested and granted from the online charging system for the rating group to which the device belongs, the quota and the charging event are used. A request message of the gateway for requesting the quota carries the identifier of the customer. The online charging system receives the message, allocates the quota for the rating group by using a customer as a granularity, and returns the quota for the rating group and the corresponding charging event to the gateway. The quota and the charging event are at a customer level. That is, another device of the customer that establishes a connection to the gateway subsequently, shares the customer-level charging session, and uses the same rating group may use the quota and the charging event. After a connection between a device of the customer and the gateway is removed, a quota used by the device continues to be used by another device using a same rating group in the customer-level charging session. It can be learned that according to the solution provided in this embodiment of the present invention, a problem of charging quota fragmentation is resolved when one customer has a plurality of devices. The online charging system allocates a quota by using a customer as a granularity, and the gateway side uses and maintains the quota by using a customer as a granularity, thereby improving charging precision and reducing performance consumption of the online charging system and the gateway.

In a possible design, when one or more devices using any rating group satisfy a condition of a charging event, the gateway reports a charging message to the online charging system. The charging message includes the identifier of the customer and charging information of the one or more devices of the customer that satisfy the charging event.

In a possible design, charging information of each device may be used as one charging information unit, and the charging information unit includes an identifier and charging information of a device currently connected to the gateway. The identifier of the device may be an IMSI, an IP address, an IMEI, a SIP address, or another identifier.

In a scenario of the offline charging mode based on the RF interface:

In the offline charging mode based on the RF interface, in the solution provided in this embodiment of the present invention, a customer-level charging session established by the gateway is a session between the gateway and a CDF (Charging Data Function, charging data function) on the RF interface. Processing for creating or using the customer-level charging session on the RF interface on a gateway side is the same as processing for creating or using the customer-level charging session between the gateway and the online charging system in the online charging mode. A manner of reporting charging information by the gateway in the customer-level charging session is the same as a manner of reporting the charging information by the gateway in the customer-level charging information in the online charging mode. That is, both are performed in one customer-level charging session, and the customer-level charging session includes the identifier of the customer and the charging information of the one or more devices. Different from the online charging scenario, in the offline charging mode, the gateway does not need to request a quota for a rating group. A charging event corresponding to the rating group is statically configured on the gateway. The gateway directly collects charging information of a plurality of devices of one customer, and reports the charging information of the plurality of devices of the customer in the customer-level charging session. According to the solution provided in this embodiment of the present invention, the gateway and the CDF do not need to create or maintain a plurality of charging sessions for a plurality of devices of the customer, but need to create or maintain only one customer-level charging session, thereby reducing network overheads and improving processing performance of the gateway and the CDF. The CDF may directly obtain the charging information of the plurality of devices of the customer in one charging session, thereby resolving a charging information fragmentation problem, simplifying processing of the charging information by the CDF, and improving processing performance of the CDF.

In a possible design, the gateway and the CDF function entity establish the customer-level charging session. A charging event for a rating group configured on the gateway is applied to one or more devices of the customer that share the customer-level charging session and use the rating group. When one or more devices using any rating group satisfy a condition of a charging event, the gateway reports a charging message to the CDF. The charging message includes the identifier of the customer and charging information of the one or more devices that satisfy the charging event.

In a possible design, charging information of each device may be used as one charging information unit, and the charging information unit includes an identifier and charging information of a device currently connected to the gateway. The identifier of the device may be an IMSI, an IP address, an IMEI, a SIP address, or another identifier.

In a scenario of the offline charging mode based on the CDR:

In the offline charging mode based on the CDR, in the solution provided in this embodiment of the present invention, the gateway creates a customer level CDR for a plurality of devices of one customer. The customer level CDR records the identifier of the customer and the charging information of the one or more devices of the customer. According to the solution provided in this embodiment of the present invention, the gateway records charging information of a plurality of devices of one customer in one CDR, and reports the charging information to an offline charging system, thereby resolving a charging information fragmentation problem, simplifying processing in the offline charging system, and improving charging processing performance and processing efficiency of the offline charging system. In addition, because the gateway does not need to create and maintain a plurality of CDRs for a plurality of devices, charging information of the plurality of devices may be reported to the offline charging system in one CDR file, thereby reducing gateway overheads and improving processing performance of the gateway.

In a possible design, when a device of the customer establishes a connection to the gateway, if no customer level CDR of the customer to which the device belongs exists on the gateway, the gateway creates a customer level CDR for the customer, to record charging information of the device. If a customer level CDR of the customer exists on the gateway, the gateway records charging information of the device by using the customer level CDR.

In a possible design, when a connection between a device of the customer and the gateway is to be removed, and the to-be-removed connection is the last connection between the customer and the gateway, the gateway closes the customer level CDR. When the to-be-removed connection is not the last connection between the customer and the gateway, the gateway continues to use the customer level CDR to record charging information of another device of the customer.

In a possible design, a charging event for any rating group of the customer is configured on the gateway, and the charging event may be applied to one or more devices of the customer that use the rating group. The gateway detects the charging event, and records, in the customer level CDR, charging information of the one or more devices of the customer that satisfy the charging event.

In a possible design, charging information of each device may be used as one charging information unit, and the charging information unit includes an identifier and charging information of a device. The identifier of the device may be an IMSI, an IP address, an IMEI, a SIP address, or another identifier.

In a possible design, a reporting condition of the customer level CDR is configured on the gateway, for example, CDR recording duration reaching limited duration or a CDR capacity or size reaching a limited capacity or size. When the reporting condition of the customer level CDR is satisfied, the gateway sends the customer level CDR to the offline charging system.

It should be noted that the gateway may perform, for all devices of the customer, the charging method for sharing a customer-level charging session or a customer level CDR provided in this application, or may perform the solution provided in this application for only some devices of the customer. For example, after a device establishes a connection to the gateway, the gateway may learn, by querying a local configuration based on an identifier of the device, querying another entity storing customer data, or using policy information of the device delivered by a PCRF, whether the device needs to share a customer-level charging session or a customer level CDR.

It should further be noted that the gateway may obtain, in a plurality of manners, the identifier of the device and the identifier of the customer. This embodiment of the present invention imposes no limitation. For example, the gateway may obtain, from a request for establishing a connection, the identifier of the device and the identifier of the customer to which the device belongs, or may learn, by using a local configuration, the identifier of the device and the identifier of the customer to which the device belongs, or may learn, by querying a subscription relationship storage entity, the identifier of the customer to which the device belongs.

According to a second aspect, an embodiment of the present invention provides a gateway applied to an online charging scenario. The gateway has a function of implementing behavior of the gateway in the online charging scenario in the method according to the first aspect. The function may be implemented by hardware, or may be implemented by hardware executing corresponding software. The hardware or software includes one or more modules corresponding to the foregoing function.

In a possible design, the gateway includes a device communications module, a determining module, a charging communications module, and an execution module. The device communications module is configured to: send a message to a device or receive a message from a device, to establish a connection to one or more devices of a customer. The determining module is configured to determine, after the device communications module establishes a connection to a device of the customer, whether a customer-level charging session of the customer exists between the gateway and an online charging system. The charging communications module is configured to communicate with the online charging system to: send, to the online charging system, a charging-related message generated by the execution module, and receive a message sent by the online charging system. The execution module is configured to: generate, when the determining module determines that no customer-level charging session of the customer exists, a request for establishing a customer-level charging session with the online charging system, where the request includes an identifier of the customer; generate a request message for requesting a quota for any rating group of the customer and a corresponding charging event from the online charging system, where the request message includes the identifier of the customer; and charge the device of the customer based on the quota and the charging event allocated by the online charging system and received by the charging communications module, and generate a message for reporting charging information of one or more devices of the customer. The message for reporting the charging information includes the identifier of the customer. The foregoing various charging-related messages generated by the execution module are sent to the online charging system by using the charging communications module.

In a possible design, the gateway includes a processor, a memory, a bus, and a communications interface. The memory is configured to store a computer-executable instruction. The processor and the memory are connected by using the bus. When the device runs, the processor executes the computer-executable instruction stored in the memory, so that the gateway performs the charging method in the online charging scenario according to the first aspect.

According to a third aspect, the present invention provides a gateway applied to a scenario of an offline charging mode based on an RF interface. The gateway has a function of implementing behavior of the gateway in the scenario of the offline charging mode based on the RF interface in the method according to the first aspect. The function may be implemented by hardware, or may be implemented by hardware executing corresponding software. The hardware or software includes one or more modules corresponding to the foregoing function.

In a possible design, the gateway includes a device communications module, a determining module, a charging communications module, and an execution module. The device communications module is configured to: send a message to a device or receive a message from a device, to establish a connection to one or more devices of a customer. The determining module is configured to determine, after the device communications module establishes a connection to a device of the customer, whether a customer-level charging session of the customer exists between the gateway and a CDF. The charging communications module is configured to communicate with an online charging system to send, to the online charging system, a charging-related message generated by the execution module. The execution module is configured to: generate, when the determining module determines that no customer-level charging session of the customer exists, a request for establishing a customer-level charging session with the CDF, where the request includes an identifier of the customer; and charge the device of the customer based on a charging event, and generate a message for reporting charging information of one or more devices of the customer. The message for reporting the charging information includes the identifier of the customer. The foregoing various charging-related messages generated by the execution module are sent to the CDF by using the charging communications module.

In a possible design, the gateway includes a processor, a memory, a bus, and a communications interface. The memory is configured to store a computer-executable instruction. The processor and the memory are connected by using the bus. When the device runs, the processor executes the computer-executable instruction stored in the memory, so that the gateway performs the charging method in the scenario of the offline charging mode based on the RF interface according to the first aspect.

According to a fourth aspect, the present invention provides a gateway applied to a scenario of an offline charging mode based on a CDR. The gateway has a function of implementing behavior of the gateway in the scenario of the offline charging mode based on the CDR in the method according to the first aspect. The function may be implemented by hardware, or may be implemented by hardware executing corresponding software. The hardware or software includes one or more modules corresponding to the foregoing function.

In a possible design, the gateway includes a device communications module, a determining module, a charging communications module, and an execution module. The device communications module is configured to: send a message to a device or receive a message from a device, to establish a connection to one or more devices of a customer. The determining module is configured to determine, after the device communications module establishes a connection to a device of the customer, whether a customer level CDR of the customer exists. The charging communications module is configured to report the customer level CDR of the customer to an offline charging system. The execution module is configured to create a customer level CDR when the determining module determines that no customer level CDR exists; and is further configured to charge the device of the customer based on a charging event of the customer, and write charging information of one or more devices of the customer into the customer level CDR of the customer. The customer level CDR further includes an identifier of the customer.

In a possible design, the gateway includes a processor, a memory, a bus, and a communications interface. The memory is configured to store a computer-executable instruction. The processor and the memory are connected by using the bus. When the device runs, the processor executes the computer-executable instruction stored in the memory, so that the gateway performs the charging method in the scenario of the offline charging mode based on the CDR according to the first aspect.

According to a fifth aspect, an embodiment of the present invention provides an online charging system. The online charging system has a function of implementing behavior of the online charging system in the method according to the first aspect. The function may be implemented by hardware, or may be implemented by hardware executing corresponding software. The hardware or software includes one or more modules corresponding to the foregoing function.

According to a sixth aspect, an embodiment of the present invention provides an online charging system. The system includes the gateway in the method embodiment in the online charging scenario according to the first aspect or in the apparatus embodiment according to the second aspect, and the online charging system entity in the method embodiment in the online charging scenario according to the first aspect or in the apparatus embodiment according to the fifth aspect.

According to a seventh aspect, an embodiment of the present invention provides a computer-readable storage medium. The computer-readable storage medium stores an instruction. When running on a computer, the instruction enables the computer to perform the method performed by the gateway in the online charging scenario in the method according to the first aspect.

According to an eighth aspect, an embodiment of the present invention provides a computer-readable storage medium. The computer-readable storage medium stores an instruction. When running on a computer, the instruction enables the computer to perform the method performed by the gateway in the scenario of the offline charging mode based on the RF interface in the method according to the first aspect.

According to a ninth aspect, an embodiment of the present invention provides a computer-readable storage medium. The computer-readable storage medium stores an instruction. When running on a computer, the instruction enables the computer to perform the method performed by the gateway in the scenario of the offline charging mode based on the CDR in the method according to the first aspect.

According to a tenth aspect, an embodiment of the present invention provides a computer program product including an instruction. When running on a computer, the instruction enables the computer to perform the method performed by the gateway in the online charging scenario in the method according to the first aspect.

According to an eleventh aspect, an embodiment of the present invention provides a computer program product including an instruction. When running on a computer, the instruction enables the computer to perform the method performed by the gateway in the scenario of the offline charging mode based on the RF interface in the method according to the first aspect.

According to a twelfth aspect, an embodiment of the present invention provides a computer program product including an instruction. When running on a computer, the instruction enables the computer to perform the method performed by the gateway in the scenario of the offline charging mode based on the CDR in the method according to the first aspect.

In addition, for technical effects of the apparatus, the system, the computer-readable storage medium, or the computer program product according to the second to the twelfth aspects, refer to technical effects of the method in the first aspect in different scenarios, and details are not described herein again.

It should further be noted that to clearly describe the technical solutions provided in the present invention, the gateway is described in different scenarios in the foregoing aspects. A person of ordinary skill in the art should understand that functions of the gateway in the different scenarios in the technical solutions in the present invention may further be combined according to a requirement, and good technical effects may also be obtained. For example, a gateway may support both a method for sharing a customer-level charging session in an online charging scenario and a method for sharing a customer level CDR in an offline charging scenario.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following descriptions show merely some embodiments of the present invention, and a person of ordinary skill in the art may still derive other drawings from these accompanying drawings without creative efforts.

DESCRIPTION OF EMBODIMENTS

The following describes the technical solutions in the embodiments of the present invention with reference to the accompanying drawings in the embodiments of the present invention. Network architectures and service scenarios described in the embodiments of the present invention are intended to more clearly describe the technical solutions in the embodiments of the present invention, but not limit the technical solutions provided in the embodiments of the present invention. A person of ordinary skill in the art may know that as the network architectures evolve and a new service scenario emerges, the technical solutions provided in the embodiments of the present invention may also be applied to a similar technical problem. A person skilled in the art is capable of designing flexible implementation solutions in a communications network according to content of the embodiments of the present invention. The following uses only several instantiated solutions to describe some possible implementations of the embodiments of the present invention in the communications network. Regardless of changes of such network elements in name, location, and interaction relationship, the network elements shall fall within the protection scope of the present invention provided that the network elements have a function of the communications network in the embodiments of the present invention.

In this application, a customer refers to a person or an organization signing a service subscription relationship with an operator. The customer usually pays for a subscribed service, and has one or more accounts in a charging system of the operator. One customer has one or more devices such as user equipment (User Equipment, UE). The device has an identifier allocated by the operator to the device. An operator network identifies a device by using an identifier of the device. In this application, the identifier of the device may be specifically one or more of an IMSI, an IP address, a SIP address, and another identifier. The one or more devices of the customer share an account balance of the customer.

In this application, the device of the customer may be all devices of the customer, or may be a device group specified in the subscription relationship. For example, a customer subscribes to an IoT service, and specifies IoT devices that belong to one user equipment group (that is, share one charging session). Other devices (for example, a mobile phone) of the customer may still have an independent charging session to control.

Figure 1:
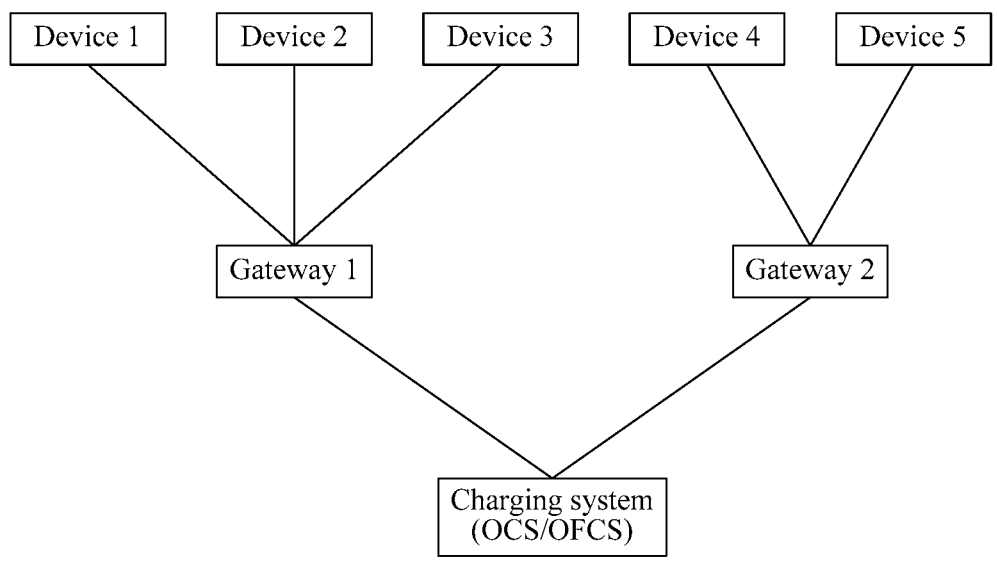
FIG. 1 is a schematic diagram of a possible application scenario according to an embodiment of the present invention.

The technical solutions described in the embodiments of the present invention may be applied to a communications system shown in FIG. 1. A large quantity of customers in the system each have a plurality of devices. The devices share one charging account. A plurality of devices of one customer are connected to one or more gateways depending on a geographic location, a device type, or a system configuration. FIG. 1 is merely a schematic architectural diagram of a network. A gateway in the figure may have different forms in particular network architectures or network deployment, and specifically correspond to different network elements. For example, in a GPRS (General Packet Radio Service) network, the gateway may be a GGSN (Gateway GPRS Support Node). In an EPC (Evolved Packet Core) network, the gateway may be a PDN GW (Packet Data Network Gate Way, packet data network gateway). In a future 5G network, due to separation between a control plane and a user plane, the gateway responsible for user equipment connection and charging may be one gateway, or may be formed by a control plane gateway and a user plane gateway. For example, the control plane gateway is responsible for charging session establishment and quota management, and the user plane gateway is responsible for traffic charging. The control plane and the user plane jointly implement a charging function. Because a current 5G network architecture is not determined, the gateway in all accompanying drawings in this specification is intended to describe a logical function rather than represent a specific physical form.

The gateway establishes a customer-level charging session or creates a customer level CDR (Charging Data Record, charging data record) for a customer, to report or record charging information of a plurality of devices of the customer. For online charging, a quota is allocated by using a customer as a granularity. That is, for a quota allocated to a rating group of a customer, all devices of the customer that use the rating group on the gateway use the quota. A charging system mentioned in the embodiments of the present invention may be an OCS (Online Charging System, online charging system) or an OFCS (Offline Charging System, offline charging system). It should further be noted that the charging information of the device reported in the customer-level charging session or recorded in the customer level CDR may have a plurality of forms. An implementation form is not limited in the embodiments of the present invention. For example, an identifier of each device and charging information of the device may be recorded in an information recording table. Alternatively, an identifier of each device and charging information corresponding to the device may be recorded in a form of an AVP (attribute value pair, attribute value pair). Regardless of which manner, the charging information of each device may be abstracted into a charging information unit. To identify a device whose charging information is recorded in the charging information unit, the charging information unit needs to include an identifier of the device. The charging information unit in the embodiments of the present invention is an abstract logical concept, and specifically refers to a data set or an information set including an identifier of a device and charging information of the device. In an actual product design and implementation, a person skilled in the art may design a specific information element or field to explicitly represent the charging information unit. Alternatively, a set of identifiers of devices and charging information of the devices may be explicitly or implicitly represented in another manner.

As shown in FIG. 1, a customer A has a plurality of devices: a device 1 to a device 5. The device 1 to the device 3 are connected to a gateway 1, and the device 4 and the device 5 are connected to a gateway 2. The customer A has one account in a charging system to pay for services on all devices of the customer A. According to a current charging mechanism:

In an online charging mode, when any device establishes a connection to a gateway, the gateway establishes a charging session in an OCS. That is, when the device 1 to the device 5 each establish a connection to the gateway 1 or the gateway 2, three charging sessions exist between the gateway 1 and the OCS system, and two charging sessions exist between the gateway 2 and OCS system. Each charging session corresponds to a different device of the customer A, and the OCS needs to allocate a different charging quota to each device.

In an offline charging mode, a gateway records charging information of all access device in different CDRs (Charging Data Record, charging data record), and needs to establish different charging sessions, to send a CDR of each device to an OFCS separately.

It can be learned that in an existing charging mode, when a customer has a plurality of devices, and a system has a large quantity of such customers, charging quota fragmentation and charging information fragmentation are caused, reducing performance and processing efficiency of a gateway and a charging system.

The technical solutions provided in the embodiments of the present invention are intended to resolve problems of charging quota fragmentation or charging information fragmentation, and reduce impact of the problems on network performance, such as occupying a relatively large quantity of charging session resources and reducing performance and processing efficiency of the gateway and the charging system. In the system shown in FIG. 1, the technical solutions provided in the embodiments of the present invention are used:

In the online charging mode, using the gateway 1 as an example, only one charging session is established between the gateway 1 and the OCS system. The charging session is a customer-level charging session. That is, the gateway 1 reports, in the charging session, charging information of all devices of the customer A that are currently connected to the gateway. A quota allocated by the OCS to the gateway 1 may be used for PDN connections of one or more devices of the customer. Specifically, if the OCS allocates, to the gateway 1, a quota corresponding to a rating group, and the rating group is used for all connections of a plurality of user equipments of the customer, the plurality of user equipments may use the quota. Generally, when the device 1 to the device 3 are all connected to the gateway 1 and use a same rating group, only one charging session and one quota exist on the gateway 1, and the charging session and the quota are shared by the three devices.

In the offline charging mode, using the gateway 2 as an example, when both the device 4 and the device 5 are connected to the gateway 2, the gateway 2 opens only one CDR, and records charging information of the two devices in the CDR. When a reporting condition of the CDR is satisfied, the gateway 2 needs to establish only one connection to the OFCS to report the CDR.

It can be learned that according to the solutions provided in the embodiments of the present invention, a quantity of connections between the gateway and the charging system is reduced, and the gateway and the charging system do not need to store a plurality of charging quotas or pieces of charging information for a plurality of devices of one customer, thereby reducing performance consumption of the gateway and the charging system. Therefore, in the gateway and the charging system, the charging information and the charging quotas of the customer are easier to maintain.

The embodiments of the present invention are further described below with reference to more accompanying drawings.

Embodiment 1: In an Online Charging Mode, a Plurality of Devices of One Customer Share a Charging Session, and the Plurality of Devices Share a Charging Quota for a Rating Group.

Figure 2:
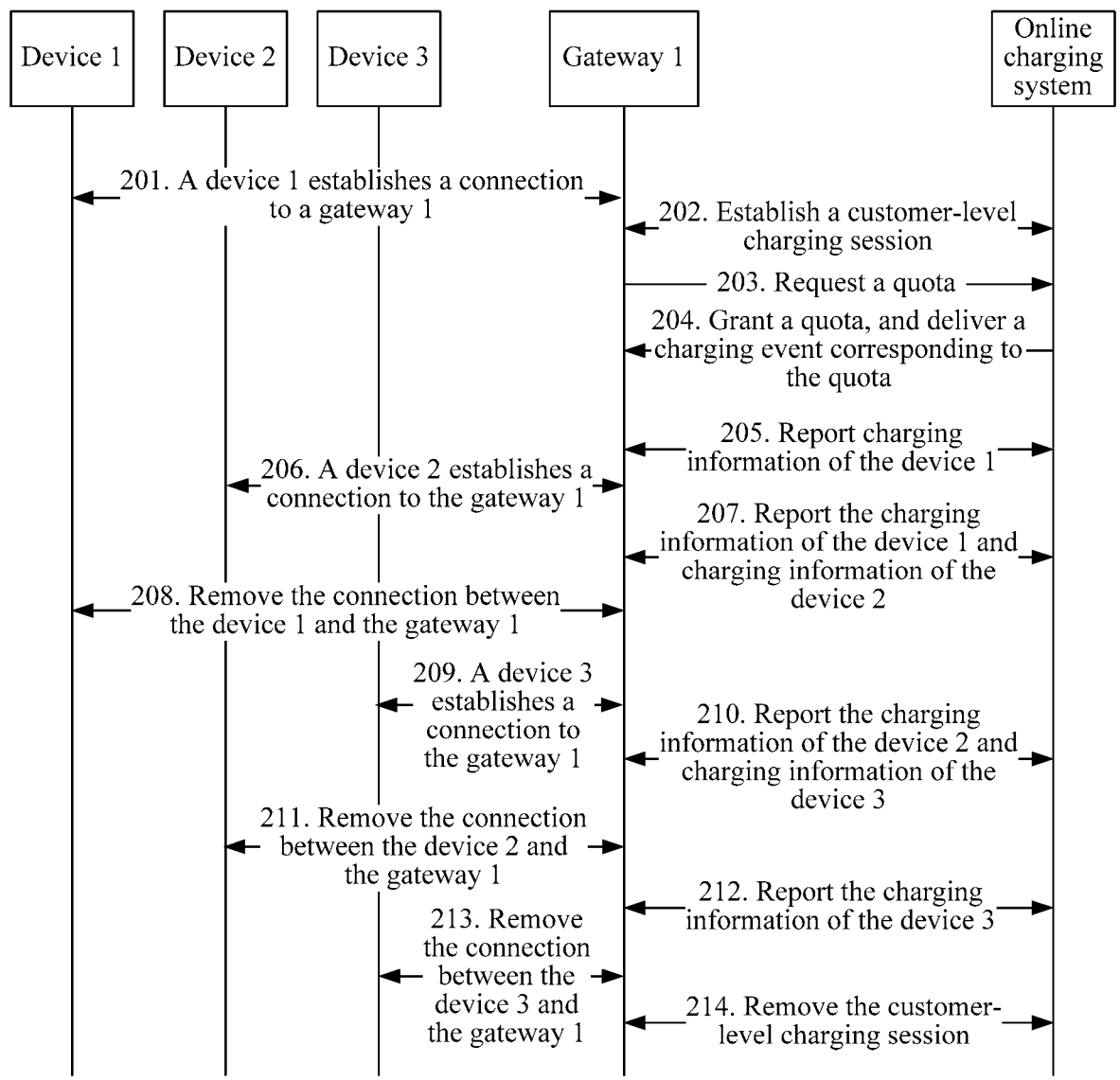
FIG. 2 is a schematic flowchart of sharing a customer-level charging session in an online charging mode according to an embodiment of the present invention.

FIG. 2 is a schematic flowchart of sharing a charging session in the online charging mode according to this embodiment of the present invention. In all embodiments of the present invention, it is assumed that a device 1, a device 2, and a device 3 belong to a customer A.

In step 201, the device 1 establishes a connection to a gateway 1. Establishing a connection is a premise for a device to execute any service. For example, in an EPC network, before performing a session or reporting data or executing any other service, a device first needs to establish a PDN connection to a PDN GW. The device 1 adds an identifier of the device to a request message for establishing the connection. The identifier of the device may be an IMSI, an IP address, an IMEI, a SIP address, or another identifier that can enable the gateway to uniquely identify the device. Before establishing a charging session to an online charging system, the gateway 1 further needs to obtain a charging policy related to the device, including information such as a rating group used by the device. A procedure of obtaining the charging policy and the rating group does not fall within the scope of the solution provided in the present invention, and is not described in detail and limited in this embodiment of the present invention. In a possible implementation, in a process in which the device establishes the connection to the gateway 1, the gateway 1 may send a policy request message to a PCRF (Policy and Charging Rules Function, policy and charging rules function entity), and the PCRF delivers, to the gateway, a QoS policy and the charging policy related to the device. In this embodiment, it is assumed that the device 1 is specified as a rating group 1 by the PCRF. It should be noted that the method for sharing the charging session in this embodiment of the present invention may be applied to all customers and devices of the customers in a network, or may be applied to only some customers and devices of the customers in a subscription or configuration manner. This embodiment of the present invention imposes no limitation. When not all customers and devices of the customers in the network need to share the charging session, before establishing the charging session, the gateway 1 further needs to determine, whether a device needs to share a charging session, to be specific, whether a device needs to share a charging session with another device of the customer to which the device belongs. For example, the gateway 1 may learn, by using the charging policy delivered by the PCRF, whether a device needs to share a charging session, or may locally configure, on the gateway 1, devices that need to share a charging session. Alternatively, the gateway 1 may query another entity (for example, a subscription relationship storage entity) based on an identifier of a device, whether the device needs to share a charging session.

In step 202, if the device does not need to share the charging session, the gateway 1 establishes a charging session for the device 1 according to the prior art. If the device 1 needs to share the charging session, and no customer-level charging session of the customer A exists on the gateway 1, the gateway 1 establishes a customer-level charging session for the customer A. The customer-level charging session is to be shared by the plurality of devices of the customer A. The gateway 1 adds an identifier of the customer to a session establishment request message sent to the online charging system, to indicate that the charging session is a customer-level charging session. The gateway 1 may obtain the identifier of the customer in a plurality of manners. This embodiment of the present invention imposes no limitation. For example, the gateway 1 may learn, by using a local configuration, the identifier of the customer that corresponds to the identifier of the device, or may obtain the identifier of the customer from a connection request message sent by the device, or may obtain the identifier of the customer by querying the subscription relationship storage entity. Because the charging session is associated with the identifier of the customer, if another device of the customer A is connected by using the gateway 1 subsequently, the gateway 1 no longer needs to establish a charging session for the another device of the customer A, and the another device may directly use the charging session, thereby reducing message exchange between network elements, saving network resources, and improving processing performance of the gateway 1 and the online charging system.

In step 203, the gateway 1 requests a charging quota for the device 1. In addition to information such as a rating group of the device, a quota request message further needs to carry the identifier of the customer, to indicate that this request is a customer-level quota request, and the requested quota may be shared by all devices of the customer A that use the rating group 1. If a CCR (Credit-Control-Request) message is used for requesting a quota, the gateway 1 may set Subscription-Id in the CCR message as the identifier of the customer. Similar to an effect of the customer-level charging session in step 202, based on the customer level quota request in step 203, the gateway is prevented from repeatedly requesting a quota for a plurality of devices using a same rating group subsequently, a plurality of devices of one customer that use a same rating group share one quota, interaction between network elements requesting a quota is reduced, and efficiency of the network and the network elements is improved.

In step 204, the online charging system delivers, for the rating group 1, a customer-level quota and a charging event corresponding to the quota. The charging event may be understood as a trigger condition of reporting charging information, for example, a regular reporting period, or reporting being performed when a remaining quota is less than a value, or a device location change. Because the charging session is a customer-level charging session, and the customer-level quota is requested by the gateway 1, the charging event corresponding to the quota may also be applied to all the devices of the customer A that use the rating group 1. If any device that is subsequently connected to the gateway and shares the customer-level charging session uses the rating group 1, once the charging event corresponding to the rating group 1 is satisfied, the gateway 1 needs to report the charging information of the device. The charging event may be understood as a charging event that may be applied to a customer level.

Figure 3:
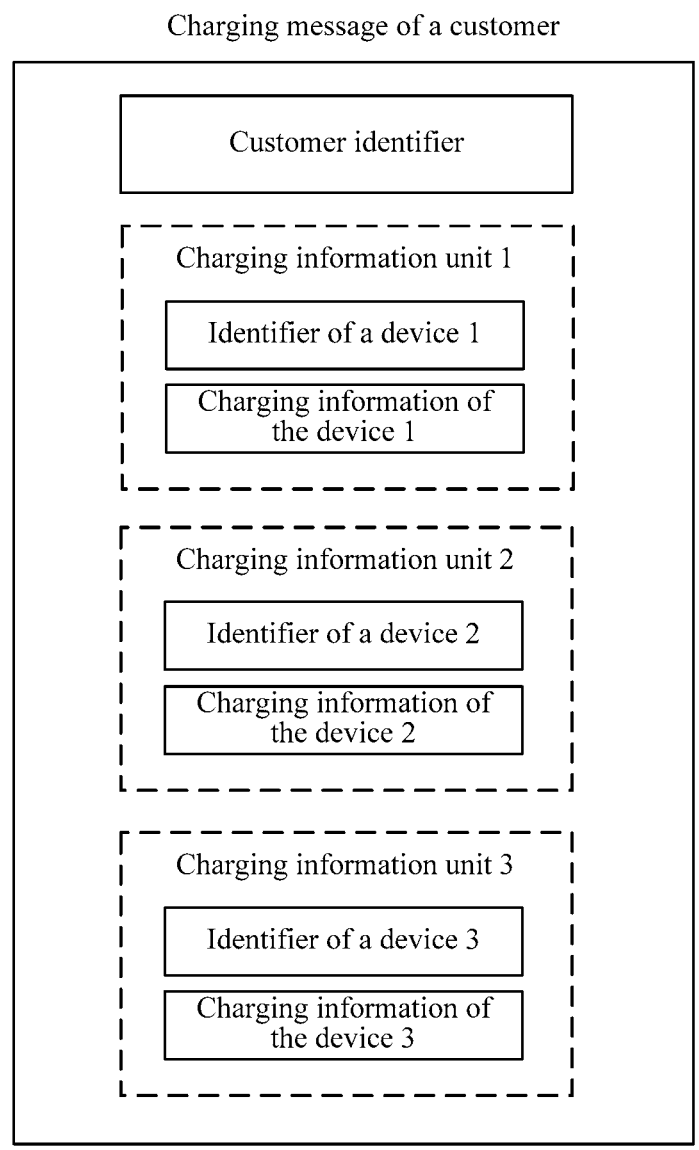
FIG. 3 is a schematic structural diagram for recording charging information of one or more devices of a customer according to an embodiment of the present invention.

In step 205, the gateway 1 reports, based on the trigger condition of the charging event, a charging message of the customer A when the device 1 satisfies the trigger condition. As shown in FIG. 3, the charging message includes the identifier of the customer A and one or more charging information units of the customer A. Each charging information unit is used for reporting charging information of one device. Because only the device 1 is connected to the gateway 1 and uses the customer-level charging session in this case, in step 205, the charging message of the customer A reported by the gateway 1 has only one charging information unit used for reporting the charging information of the device 1. The charging information unit of the device 1 includes the identifier of the device 1 and the charging information of the device. The identifier of the device may be specifically one or more of an IMSI, an IP address, an IMEI, a SIP address, and another identifier. If the CCR message is used for reporting the charging information, the gateway 1 may set Subscription-Id in the CCR message as the identifier of the customer, and adds a plurality of pieces of PS-Information to Service-Information. Each piece of PS-Information is used as one charging information unit, where Subscription-Id in PS-Information is set as an identifier of a device of the customer, to identify a device whose charging information is the charging information unit. In this embodiment of the present invention, a charging message reported by the gateway may carry charging information of a plurality of devices of the customer. This not only reduces network overheads but also helps the charging system merge charging information of a plurality of devices of one customer. The charging system may directly obtain, from a reported customer-level charging message, the charging information of the plurality of devices of the customer. It is readily appreciated and understood that the charging information unit has an identifier of a device to distinguish a recorded identifier of a device. Therefore, according to a specific service scenario and a service requirement, in the charging message of the customer shown in FIG. 3, charging information of one device may also be included in a plurality of charging information units. For example, both a charging information unit 1 and a charging information unit 2 in FIG. 3 may be used for recording the charging information of the device 1.

In step 206, the device 2 establishes a connection to the gateway 1. Similar to descriptions in step 201 and step 202, the gateway 1 obtains information related to the device 2, such as an identifier of the device, an identifier of a customer to which the device belongs, and a charging policy for the device 2. In this embodiment, it is assumed that the device 2 also uses the rating group 1. The gateway 1 determines that the device 2 needs to share the charging session, and the customer-level charging session of the customer A exists on the gateway 1. In this case, the gateway 1 no longer creates a charging session for the device 2, and the device 2 uses the customer-level charging session of the customer A that is created in step 202. Because the device 2 also uses the rating group 1, the quota for the rating group 1 and the corresponding charging event delivered by the charging system in step 204 may also be applied to the device 2.

In step 207, the gateway 1 detects that both the device 1 and the device 2 satisfy the trigger condition of the charging event, and report the charging message of the customer A. The charging message includes the customer identifier of the customer A and two charging information units. The two charging information units respectively include the charging information of the device 1 and charging information of the device 2. For a specific possible implementation, refer to descriptions in step 205, and details are not described again. It should be noted that in the customer-level charging session, in a process in which the device 1 and the device 2 use the quota, if the quota is insufficient, the gateway needs to request a new quota, and a request message for requesting the quota needs to carry the identifier of the customer. A process of requesting the new quota is the same as descriptions in step 203, and details are not described again. It should further be noted that the device 1 and the device 2 may satisfy the trigger condition of the charging event for a plurality of times, and the gateway 1 may report the charging message for a plurality of times. A procedure in this embodiment is merely schematic, and imposes no limitation on a quantity of times that the gateway reports the charging message.

In step 208, because the device goes offline or a service is completed or due to another network reason, the connection between the device 1 and the gateway 1 is removed. According to the prior art, the gateway 1 needs to remove the charging session of the device 1. However, because the charging session used by the device 1 is a customer-level charging session, and is shared by a plurality of devices, the gateway 1 needs to determine whether another device is sharing the customer-level charging session currently. In this case, the device 2 is still connected to the gateway and is using the charging session. Therefore, the gateway 1 needs to reserve the customer-level charging session, and reserve the previously requested and granted quota and the corresponding charging session.

In step 209, the device 3 establishes a connection to the gateway 1. Similar to processing in step 206, because the customer-level charging session of the customer A still exists currently, the device 3 uses the customer-level charging session. Assuming that the device 3 uses the rating group 1, the device 2 and the device 3 share the quota.

In step 210, the gateway 1 detects that both the device 2 and the device 3 satisfy the trigger condition of the charging event, and reports the charging message of the customer A. The charging message includes the customer identifier of the customer A and two charging information units. The two charging information units respectively include the charging information of the device 2 and charging information of the device 3. For a specific possible implementation, refer to descriptions in step 205, and details are not described again.

In step 211, the connection between the device 2 and the gateway 1 is removed, and only the customer-level charging session used by the device 3 is remained.

In step 212, the gateway 1 reports the charging information of the device 3. The reported charging message includes the identifier of the customer A and a charging information unit of the device 3.

In step 213, the connection between the device 3 and the gateway 1 is removed. The gateway 1 determines that currently on the gateway, there is no connection between another device and the customer A. The to-be-connected connection is the last connection between the customer A and the gateway. In this case, the gateway 1 simultaneously removes the customer-level charging session in step 214.

In this embodiment, the gateway does not need to establish three charging sessions for the three devices but needs to establish only one charging session, and the gateway does not need to request a quota for each of the three devices but needs to request a quota once. The charging event corresponding to the quota may be applied to all of the three devices. When all of the three devices satisfy the trigger condition of the charging event, the gateway may report the charging information of the plurality of devices in one charging message. It can be learned that according to the solution provided in this embodiment of the present invention, performance of the gateway and the charging system is improved while problems of charging information fragmentation and charging quota fragmentation caused when one customer has a plurality of devices are resolved.

Embodiment 2: In an Online Charging Mode, a Plurality of Devices of One Customer Share a Charging Session, and the Plurality of Devices Use Different Rating Groups.

Figure 4:
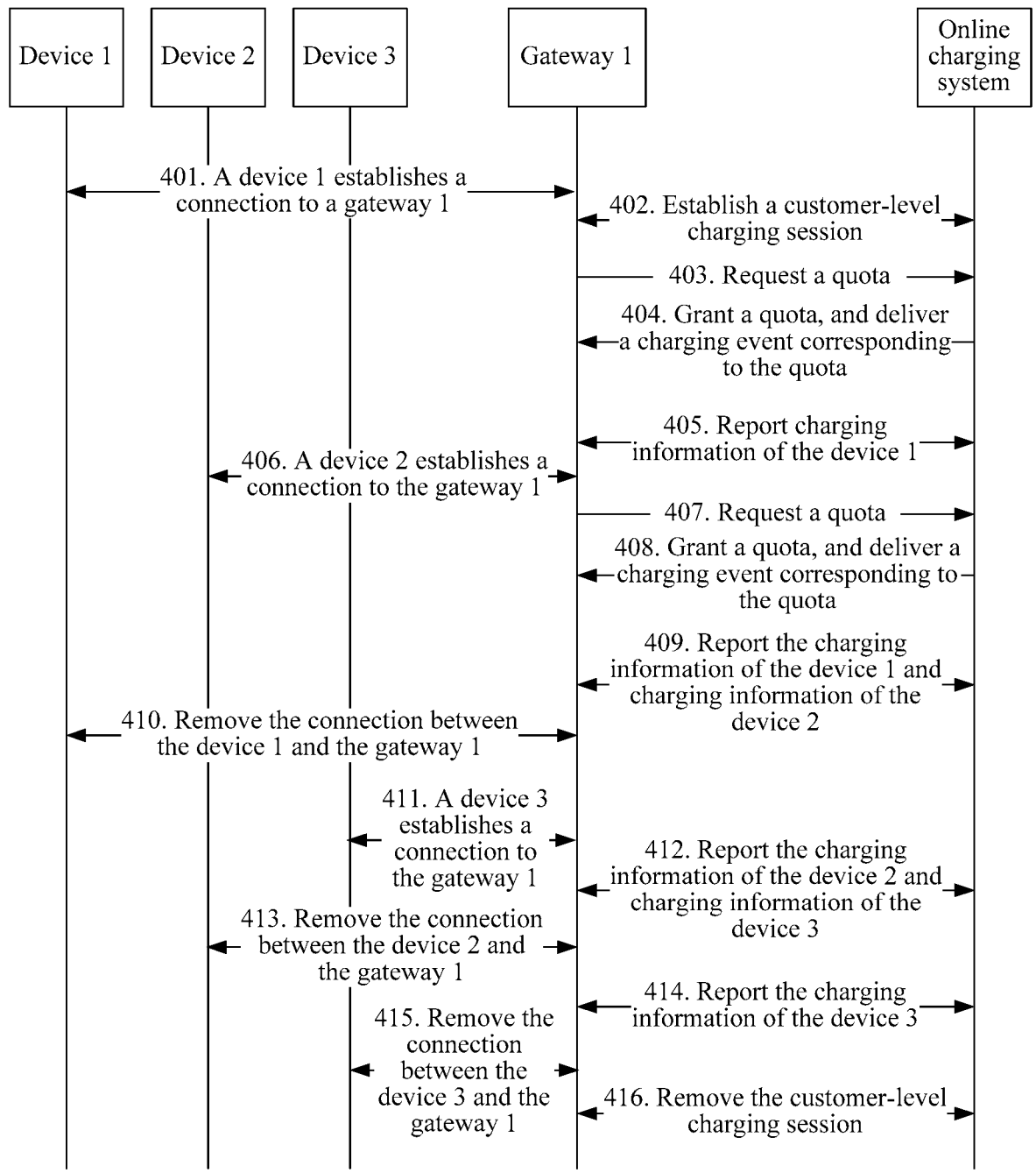
FIG. 4 is another schematic flowchart of sharing a customer-level charging session in an online charging mode according to an embodiment of the present invention.

In Embodiment 1, it is assumed that the three devices of the customer A use a same rating group. When the devices of the customer A use different rating groups, the gateway 1 needs to request a quota for each of the different rating groups. It is assumed that the device 1 of the customer A uses a rating group 1, the device 2 and the device 3 use a rating group 2. FIG. 4 is a possible schematic flowchart of charging session creation and charging message reporting. Different from FIG. 2, in step 406, after the device 2 establishes a connection to the gateway 1, the gateway 1 learns that the device 2 uses the rating group 2. Although the device 2 may share a customer-level charging session with the device 1, because the gateway currently does not request a quota for the rating group 2, the gateway 1 needs to request a quota for the rating group 2 in step 407. A request message for requesting the quota in step 407 carries the customer identifier of the customer A. A quota and a charging event corresponding to the quota that are obtained in step 408 may be applied to all devices of the customer A that use the rating group 2. That is, after the device 3 establishes a connection to the gateway, the gateway 1 no longer needs to request a quota for the device 3. For other steps in FIG. 4, refer to descriptions of the steps in FIG. 2, and details are not described herein again.

Embodiment 3: In an Offline Charging Mode Based on an RF Interface, a Plurality of Devices of One Customer Share a Charging Session.

Figure 5:
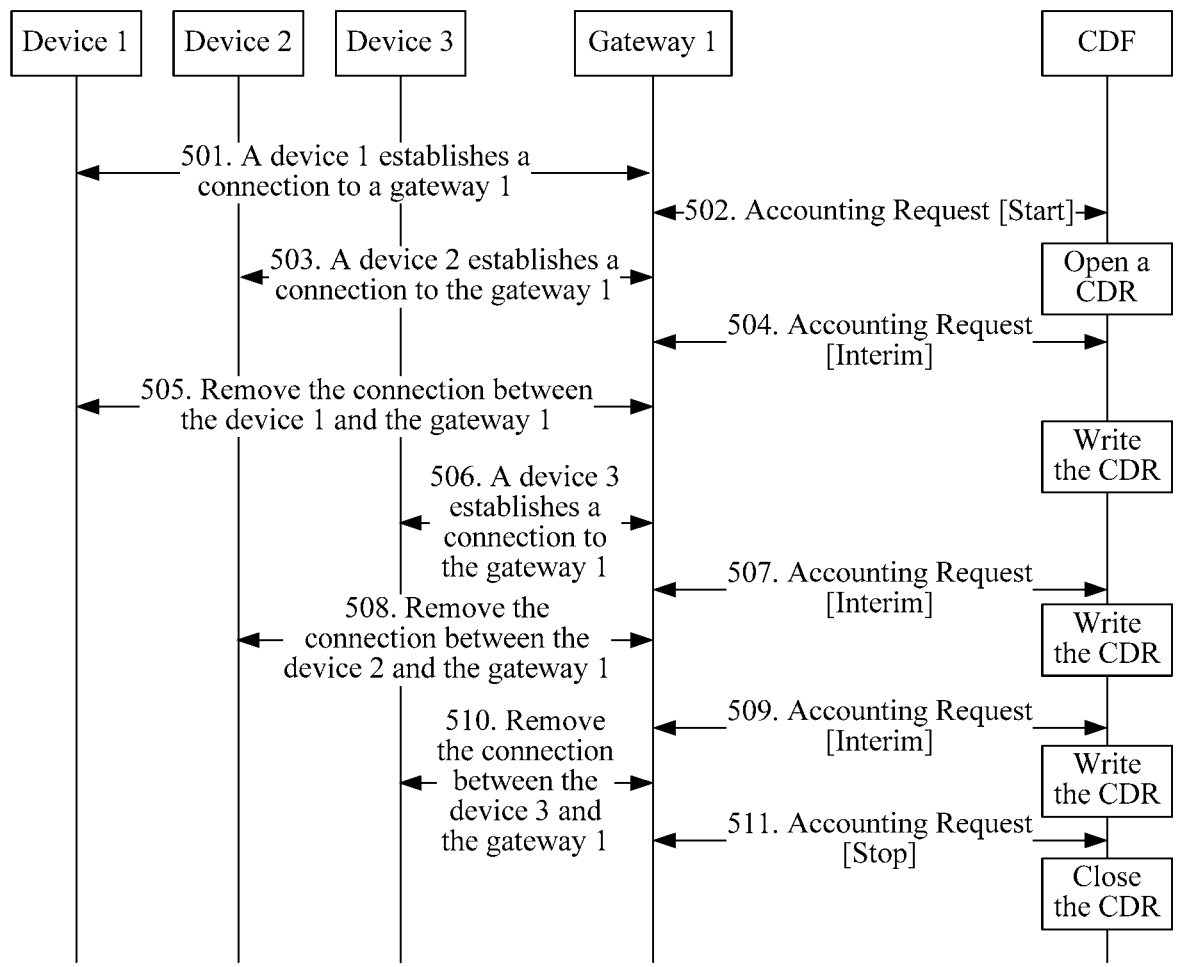
FIG. 5 is a schematic flowchart of sharing a customer-level charging session in an offline charging mode based on an RF interface according to an embodiment of the present invention.

The solution provided in this method embodiment may be applied to not only online charging but also offline charging. FIG. 5 shows a possible embodiment of the solution provided in the present invention in the offline charging mode based on the RF interface. The RF interface is an interface between a PCN (Packet switched Core network Node, packet switched core network node) network element (for example, a PDN GW) and a CDF (Charging Data Function). In this implementation, the PDN GW reports charging information to the CDF, and the CDF generates a CDR (Charging Data Record, charging data record), and finally reports the CDR to an offline charging system. That is, in the network architecture in FIG. 1, a CDF entity is located between the gateway and the offline charging system, and is responsible for generating a CDR and reporting the CDR to the offline charging system. In the offline charging mode based on the RF interface, the gateway does not need to request a quota, but directly report the charging information to the CDF based on a charging event corresponding to a locally configured rating group. A step and a method that are the same as those in the foregoing embodiments are not described again in this embodiment, for example, how the gateway obtains information related to a device (for example, the identifier of the device, the identifier of the customer, the charging policy, the rating group, and whether a charging session needs to be shared). Only descriptions about how a plurality of devices of one customer share a charging session and report charging information of the plurality of devices in one charging message in the offline charging mode based on the RF interface are emphasized herein.

In step 502, the gateway 1 sends an Accounting Request [start] message to the CDF, and starts a customer-level charging session between the gateway and the CDF, where the message carries the identifier of the customer. The CDF receives the Accounting Request [start] message, and opens a CDR for the customer A, to record charging information of a device of the customer A.

In step 503, after the device 2 establishes a connection to the gateway 1, the gateway 1 determines that a charging session has been established for the customer A currently, and no longer sends the Accounting Request [start] message to the CDF. The device 2 and the device 1 share one customer-level charging session.

In step 504, if the device 1 and the device 2 satisfy the charging event corresponding to the rating group, the gateway 1 reports charging information of the device 1 and the device 2 in an Accounting Request [Interim] message. The Accounting Request [Interim] message includes the customer identifier of the customer A and two charging information units. The two charging information units respectively include the identifiers of the device 1 and the device 2 and the charging information of the device 1 and the device 2. The CDF receives the Accounting Request [Interim] message, and writes the charging information of the device 1 and the device 2 into the CDR of the customer A.

In step 505 and step 508, when a connection between a device and the gateway 1 is to be removed, the gateway 1 determines that currently there is another connection of the customer A, and reserves a charging session between the customer A and the CDF. After another device of the customer A goes online, the charging session continues to be used for reporting charging information of the another device. For example, in step 507, the gateway 1 reports the charging information of the device 2 and the device 3, and in step 509, the gateway 1 reports the charging information of the device 3.

In step 511, after the last connection between the customer A and the gateway 1 is removed (that is, the connection between the device 3 and the gateway is removed), the gateway 1 sends an Accounting Request [Stop] message to remove the charging session of the customer A that is between the gateway 1 and the CDF. After receiving the message, the CDF closes the CDR of the customer A.

It can be learned that according to the solution provided in this embodiment of the present invention, in the offline charging mode based on the RF interface, a plurality of devices of one customer that are connected to the gateway share one charging session, and a charging message reported by the gateway to the CDF includes charging information of the plurality of devices. Therefore, the gateway does not need to establish a plurality of charging sessions with the CDF, and the CDF does not need to open a plurality of CDRs for one customer, thereby reducing network overheads and simplifying charging processing on a gateway side and a CDF side.

Embodiment 3 describes a schematic flowchart of sharing a charging session by a plurality of devices in a scenario in which the CDF function and the gateway are separately deployed. When the gateway has a function of the CDF, the gateway locally records and maintains the CDR of the customer, and reports the CDR to the offline charging system according to a predetermined rule.

Embodiment 4: In an Offline Charging Mode Based on a CDR, a Plurality of Devices of One Customer Share a CDR.

Figure 6:
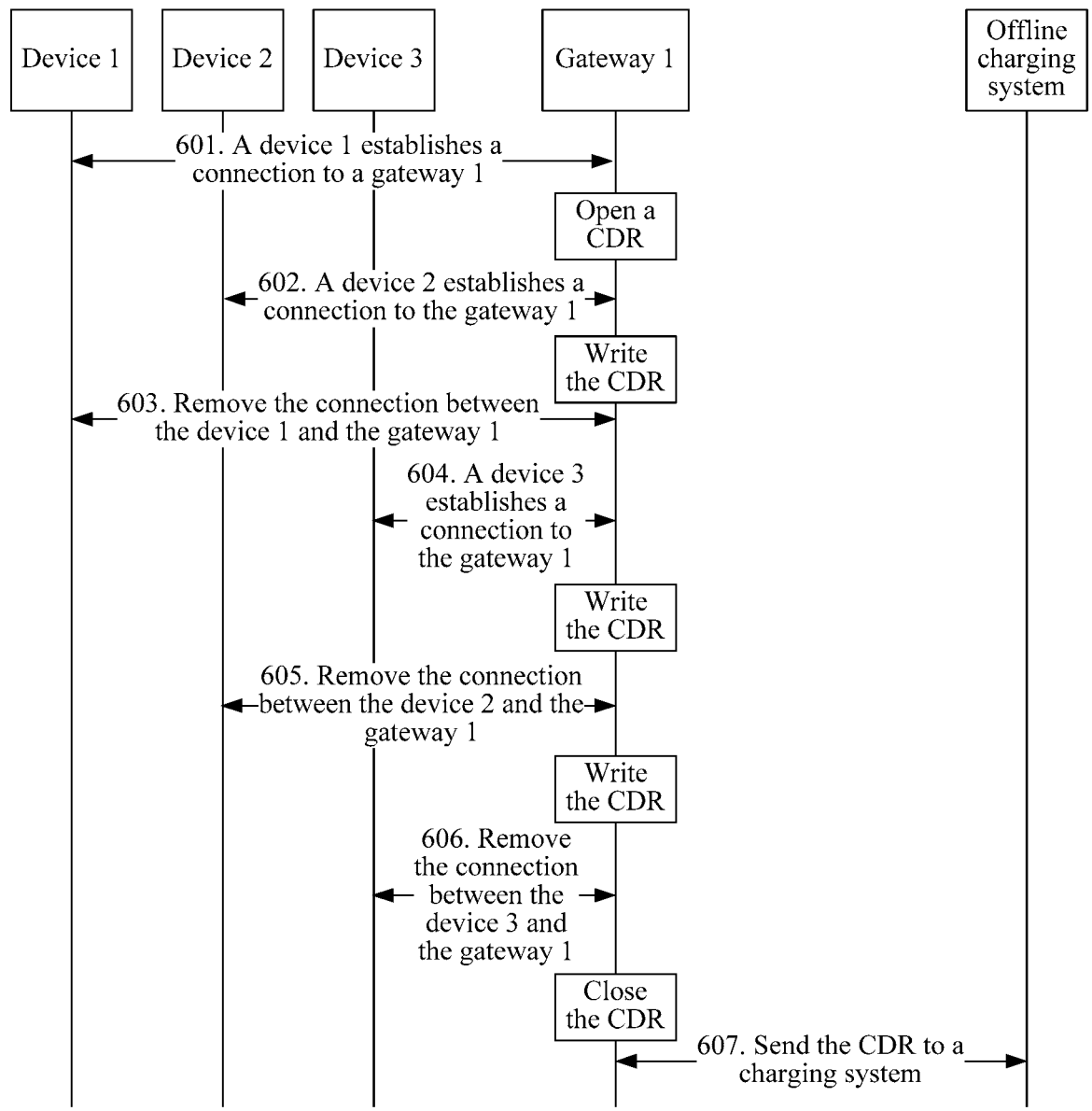
FIG. 6 is a schematic flowchart of sharing a customer level CDR in an offline charging mode according to an embodiment of the present invention.

FIG. 6 is a schematic flowchart of sharing a CDR by a plurality of devices of one customer when a gateway is in the offline charging mode based on the CDR.

In step 601, after the device 1 establishes a connection to the gateway 1, if the gateway 1 determines that currently there is no other connection to the customer A, the gateway 1 opens a CDR of the customer A. The CDR records the customer identifier of the customer A. The gateway 1 collects statistics about charging information (for example, network resources and data traffic use information) of the device 1, and writes the charging information of the device 1 into the CDR when the device 1 satisfies a charging event locally configured by the gateway. It should be noted that the method for sharing the CDR in the offline charging mode may be applied to all customers and devices of the customers in a network, or may be applied to only some customers and devices of the customers in a subscription or configuration manner. This embodiment of the present invention imposes no limitation. When not all customers and devices of the customers in the network need to share the CDR, the gateway 1 only needs to perform the method for sharing the CDR described in this embodiment of the present invention for a device that needs to share a CDR. If no device needs to share a CDR, according to the prior art, the gateway 1 opens a CDR for each device connected to the gateway 1. The gateway 1 may learn, from a charging policy delivered by a PCRF, whether a device needs to share a CDR, or may locally configure, on the gateway 1, devices that need to share a CDR. Alternatively, the gateway 1 may query another entity (for example, a subscription relationship storage entity) based on the identifier of the device, whether the device needs to share a CDR.

In step 602 and step 604, when another device establishes a connection to the gateway 1, because the gateway 1 has opened the CDR for the customer A, the gateway 1 no longer opens a new CDR. Instead, a plurality of devices share the customer level CDR. When any device satisfies the charging event, the gateway 1 writes charging information of the device into the CDR as a charging information unit. The charging information unit includes an identifier of the device.

In step 603 and step 605, when a connection between a device and the gateway 1 is to be removed, because the CDR is still used by another device, the gateway 1 does not close the CDR, but continues to use the CDR to record charging information of the another device.

In step 606, after the last connection between the customer A and the gateway 1 is removed, the gateway 1 closes the CDR of the customer A.

In step 607, when a reporting condition of the CDR is satisfied, for example, recording duration in the CDR reaching limited duration or a CDR capacity reaching a capacity limit, the gateway 1 reports the CDR. The CDR includes the customer identifier of the customer A and charging information of a plurality of devices of the customer A.

The foregoing has described the solutions provided in the embodiments of the present invention mainly from the perspective of interaction between network elements. It may be understood that to implement the foregoing functions, various network elements such as UE, a base station, and a core network entity include corresponding hardware structures and/or software modules for performing the various functions. A person skilled in the art should be easily aware that in combination with the examples of the units and the algorithm steps described in the embodiments disclosed in this specification, the present invention may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present invention.

Embodiment 5: Computer Apparatus Embodiment

Figure 7:
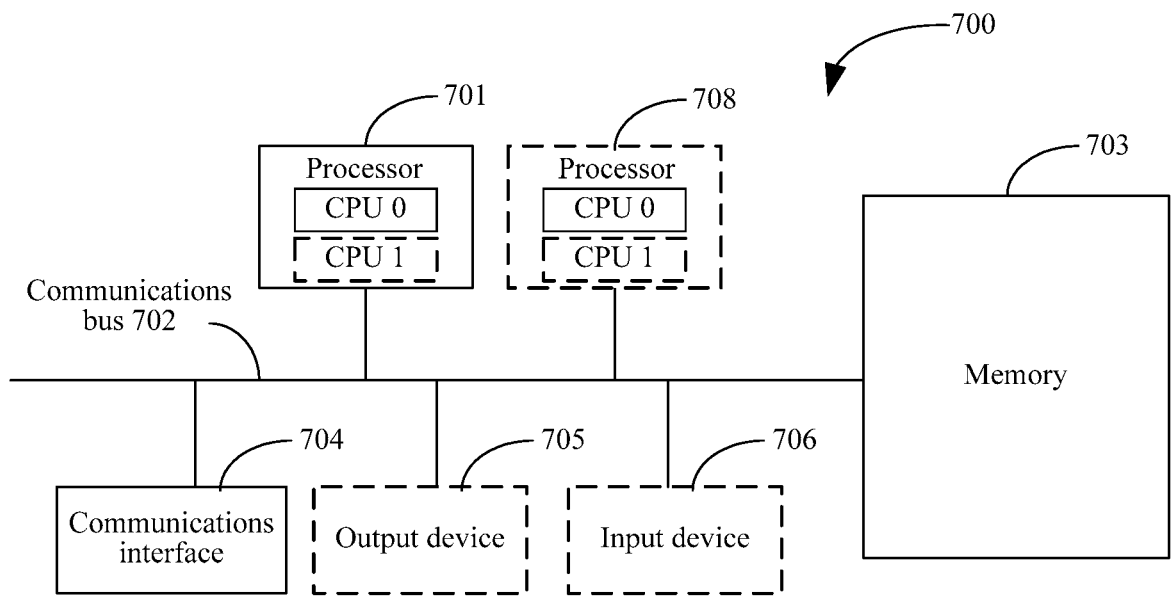
FIG. 7 is a schematic diagram of a computer apparatus according to an embodiment of the present invention.

As shown in FIG. 7, the gateway, the online charging system, and the offline charging system in Embodiment 1 to Embodiment 4 may be implemented by a computer device (or system) in FIG. 7.

FIG. 7 is a schematic diagram of the computer device according to an embodiment of the present invention. The computer device 700 includes at least one processor 701, a communications bus 702, a memory 703, and at least one communications interface 704.

The processor 701 may be a general-purpose central processing unit (CPU), a microprocessor, an application-specific integrated circuit (application-specific integrated circuit, ASIC), or one or more integrated circuits configured to control execution of a program in the solutions of the present invention.

The communications bus 702 may include a path for transmitting information between the foregoing components. The communications interface 704 is a type of apparatus that uses any transceiver, and is configured to communicate with other devices or communications networks such as the Ethernet, a radio access network (RAN), and a wireless local area network (Wireless Local Area Network, WLAN).

The memory 703 may be a read-only memory (read-only memory, ROM) or another type of static storage device that can store static information and a static instruction, a random access memory (random access memory, RAM), or another type of dynamic storage device that can store information and an instruction; or may be an electrically erasable programmable read-only memory (Electrically Erasable Programmable Read-Only Memory, EEPROM), a compact disc read-only memory (Compact Disc Read-Only Memory, CD-ROM) or another compact disc storage medium, optical disc storage medium (including a compact disc, a laser disc, an optical disc, a digital versatile disc, a Blu-ray disc, or the like) and magnetic disk storage medium, another magnetic storage device, or any other medium that can be configured to carry or store expected program code in a form of an instruction or a data structure and that is accessible by a computer, but is not limited thereto. The memory may independently exist and be connected to the processor by using the bus. Alternatively, the memory may be integrated with the processor.

The memory 703 is configured to store application program code for performing the solution in the present invention, and the application program code is controlled and executed by the processor 701. The processor 701 is configured to execute the application program code stored in the memory 703, to implement a function of the gateway, the online charging system, or the offline charging system in the methods in this patent.

During specific implementation, in an embodiment, the processor 701 may include one or more CPUs, for example, a CPU 0 and a CPU 1 in FIG. 7.

During specific implementation, in an embodiment, the computer device 700 may include a plurality of processors such as the processor 701 and a processor 708 in FIG. 7. Each of these processors may be a single-core (single-CPU) processor, or may be a multi-core (multi-CPU) processor. Herein the processor may be one or more devices, circuits, and/or processing cores used for processing data (for example, a computer program instruction).

During specific implementation, in an embodiment, the computer device 700 may further include an output device 705 and an input device 706. The output device 705 communicates with the processor 701, and may display information in various manners. For example, the output device 705 may be a liquid crystal display (liquid crystal display, LCD), a light emitting diode (light emitting diode, LED) display device, a cathode ray tube (cathode ray tube, CRT) display device, a projector (projector), or the like. The input device 706 communicates with the processor 701, and may receive an input of a user in various manners. For example, the input device 706 may be a mouse, a keyboard, a touchscreen device, a sensing device, or the like.

The computer device 700 may be a general-purpose computer device or a special-purpose computer device. During specific implementation, the computer device 700 may be a desktop computer, a portable computer, a network server, a palmtop computer, a mobile phone, a tablet computer, a wireless terminal device, a communications device, an embedded device, or a device having a structure similar to that in FIG. 7. In this embodiment of the present invention, a type of the computer device 700 is not limited.

Embodiment 6: Gateway Apparatus Embodiment in an Online Charging Scenario

In this embodiment of the present invention, function module division may be performed on the gateway in Embodiment 1 and Embodiment 2. For example, various function modules may be divided corresponding to various functions, or two or more functions may be integrated into one processing module. The integrated module may be implemented in a form of hardware, or may be implemented in a form of a software function module. It should be noted that the module division in this embodiment of the present invention is an example, and is merely logical function division. There may be another division manner in an actual implementation.

Figure 8:
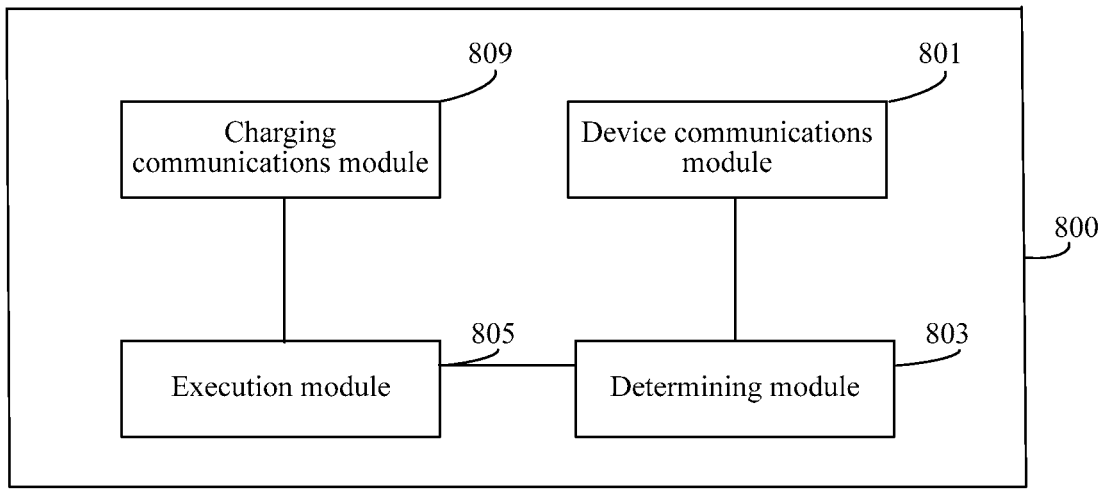
FIG. 8 is a schematic structural diagram of a gateway according to an embodiment of the present invention.

For example, when various function modules are divided corresponding to various functions, FIG. 8 is a possible schematic structural diagram of a gateway implementing sharing of a charging session in the foregoing embodiments. The device 800 includes a device communications module 801, a determining module 803, an execution module 805, and a charging communications module 809.

The device communications module 801 is configured to send a message to a device or receive a message from a device, to establish a connection to one or more devices of a customer.

The determining module 803 is configured to determine, after the device communications module 801 establishes a connection to a device of the customer, whether a customer-level charging session of the customer exists between the gateway and an online charging system.

The charging communications module 809 is configured to communicate with the online charging system to: send, to the online charging system, a charging-related message generated by the execution module 805, and receive a message sent by the online charging system.

The execution module 805 is configured to: generate, when the determining module 803 determines that no customer-level charging session of the customer exists, a request for establishing a customer-level charging session with the online charging system, where the request includes an identifier of the customer; generate a request message for requesting a quota for any rating group of the customer and a corresponding charging event from the online charging system, where the request message includes the identifier of the customer; and charge the device of the customer based on the quota and the charging event allocated by the online charging system and received by the charging communications module 809, and generate a message for reporting charging information of one or more devices of the customer. The message for reporting the charging information includes the identifier of the customer. The foregoing various charging-related messages generated by the execution module 805 are sent to the online charging system by using the charging communications module 809.

All related content of the steps in Embodiment 1 and Embodiment 2 may be referred for the function descriptions of the corresponding function modules. Details are not described herein again.

The function module may be implemented in a form of hardware, or may be implemented in a form of a software function module. In a simple embodiment, a person skilled in the art may appreciate that the gateway 800 may use a form shown in FIG. 7. For example, the determining module 803 and the execution module 805 in FIG. 8 may be implemented by the processor 701 in FIG. 7 by invoking the code in the memory 703, and the device communications module 801 and the charging communications module 809 in FIG. 8 may be implemented by the communications interface 704 in FIG. 7. This embodiment of the present invention imposes no limitation thereon.

Embodiment 7: Apparatus Embodiment in a Scenario of an Offline Charging Mode Based on an RF Interface In this embodiment of the present invention, function module division may be performed on the gateway in Embodiment 3. For example, various function modules may be divided corresponding to various functions, or two or more functions may be integrated into one processing module. The integrated module may be implemented in a form of hardware, or may be implemented in a form of a software function module. It should be noted that the module division in this embodiment of the present invention is an example, and is merely logical function division. There may be another division manner in an actual implementation.

Figure 9:
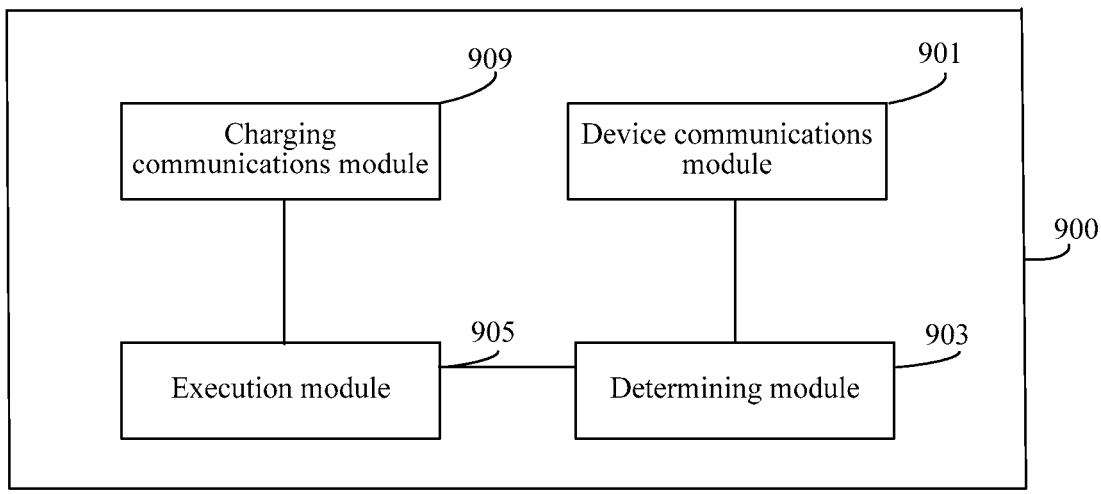
FIG. 9 is another schematic structural diagram of a gateway according to an embodiment of the present invention.

For example, when various function modules are divided corresponding to various functions, FIG. 9 is a possible schematic structural diagram of a gateway implementing sharing of a charging session in the foregoing embodiments. The device 900 includes a device communications module 901, a determining module 903, an execution module 905, and a charging communications module 909.

The device communications module 901 is configured to send a message to a device or receive a message from a device, to establish a connection to one or more devices of a customer.

The determining module 903 is configured to determine, after the device communications module 901 establishes a connection to a device of the customer, whether a customer-level charging session of the customer exists between the gateway and a CDF.

The charging communications module 909 is configured to communicate with the online charging system to send, to the online charging system, a charging-related message generated by the execution module 905.

The execution module 905 is configured to: generate, when the determining module 903 determines that no customer-level charging session of the customer exists, a request for establishing a customer-level charging session with the CDF, where the request includes an identifier of the customer; and charge the device of the customer based on a charging event, and generate a message for reporting charging information of one or more devices of the customer. The message for reporting the charging information includes the identifier of the customer. The foregoing various charging-related messages generated by the execution module 905 are sent to the CDF by using the charging communications module 909.

All related content of the steps in Embodiment 3 may be referred for the function descriptions of the corresponding function modules. Details are not described herein again.

The function module may be implemented in a form of hardware, or may be implemented in a form of a software function module. In a simple embodiment, a person skilled in the art may appreciate that the gateway 900 may use a form shown in FIG. 7. For example, the determining module 903 and the execution module 905 in FIG. 9 may be implemented by the processor 701 in FIG. 7 by invoking the code in the memory 703, and the device communications module 901 and the charging communications module 909 in FIG. 9 may be implemented by the communications interface 704 in FIG. 7. This embodiment of the present invention imposes no limitation thereon.

Embodiment 8: Apparatus Embodiment in a Scenario of an Offline Charging Mode Based on a CDR In this embodiment of the present invention, function module division may be performed on the gateway in Embodiment 4. For example, various function modules may be divided corresponding to various functions, or two or more functions may be integrated into one processing module. The integrated module may be implemented in a form of hardware, or may be implemented in a form of a software function module. It should be noted that the module division in this embodiment of the present invention is an example, and is merely logical function division. There may be another division manner in an actual implementation.

Figure 10:
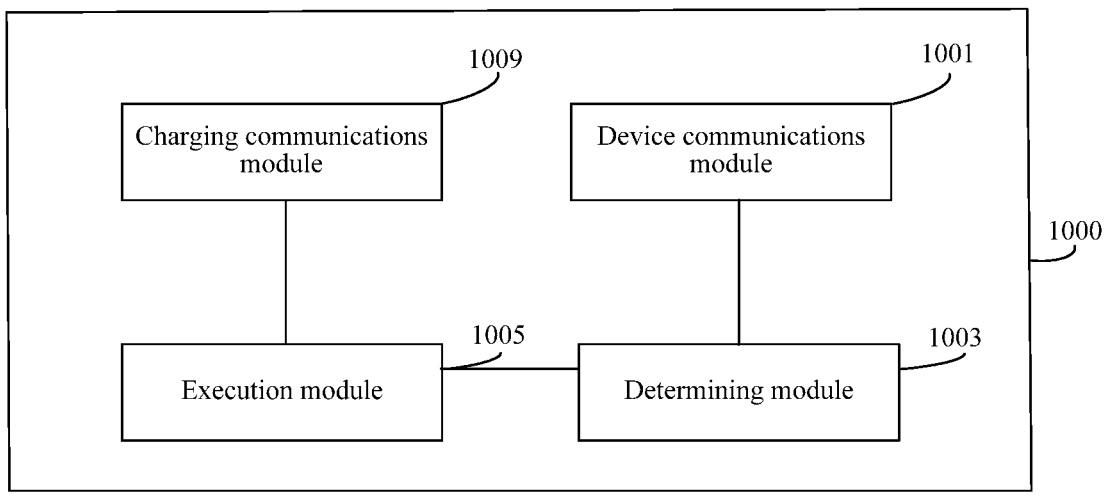
FIG. 10 is another schematic structural diagram of a gateway according to an embodiment of the present invention.

For example, when various function modules are divided corresponding to various functions, FIG. 10 is a possible schematic structural diagram of a gateway implementing sharing of a charging session in the foregoing embodiments. The device 1000 includes a device communications module 1001, a determining module 1003, an execution module 1005, and a charging communications module 1009.

The device communications module 1001 is configured to send a message to a device or receive a message from a device, to establish a connection to one or more devices of a customer.

The determining module 1003 is configured to determine, after the device communications module 1001 establishes a connection to a device of the customer, whether a customer level CDR of the customer exists.

The charging communications module 1009 is configured to report, to an offline charging system, the customer level CDR of the customer that is created and recorded by the execution module 1005.

The execution module 1005 is configured to: create a customer level CDR when the determining module 1003 determines that no customer level CDR exists; charge the device of the customer based on a charging event of the customer; and write charging information of one or more devices of the customer into the customer level CDR of the customer. The customer level CDR further includes an identifier of the customer.

All related content of the steps in Embodiment 4 may be referred for the function descriptions of the corresponding function modules. Details are not described herein again.

The function module may be implemented in a form of hardware, or may be implemented in a form of a software function module. In a simple embodiment, a person skilled in the art may appreciate that the gateway 1000 may use a form shown in FIG. 7. For example, the determining module 1003 and the execution module 1005 in FIG. 10 may be implemented by the processor 701 in FIG. 7 by invoking the code in the memory 703, and the device communications module 1001 and the charging communications module 1009 in FIG. 10 may be implemented by the communications interface 704 in FIG. 7. This embodiment of the present invention imposes no limitation thereon.

Embodiment 9: Functional Apparatus Embodiment in an Online Charging Scenario

In this embodiment of the present invention, function module division may be performed on the online charging system or the CDF in Embodiment 1 to Embodiment 4. For example, various function modules may be divided corresponding to various functions, or two or more functions may be integrated into one processing module. The integrated module may be implemented in a form of hardware, or may be implemented in a form of a software function module. It should be noted that the module division in this embodiment of the present invention is an example, and is merely logical function division. There may be another division manner in an actual implementation.

Figure 11:
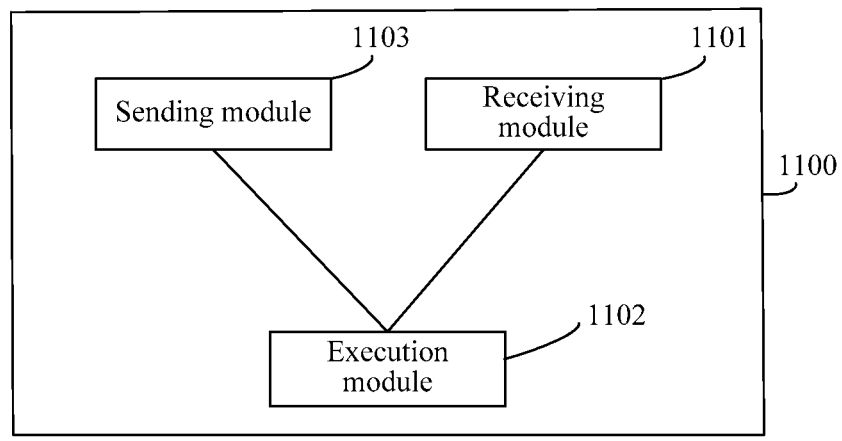
FIG. 11 is a schematic structural diagram of an online charging system according to an embodiment of the present invention.

For example, when various function modules are divided corresponding to various functions, FIG. 11 is a possible schematic structural diagram of a gateway implementing sharing of a charging session in the foregoing embodiments. The device 1100 includes a receiving module 1101, an execution module 1102, and a sending module 1103.

The receiving module 1101 is configured to receive a message from a gateway, including a request message for establishing a customer-level charging session, a customer-level quota request message, and a customer-level charging message.

The execution module 1102 is configured to record content in the request message after receiving the request message of the gateway, and generate a corresponding response message. For example, after receiving the request message for establishing a customer-level charging session, the execution module 1102 records an identifier of a customer in the request message, marks the charging session as a customer-level charging session of the customer, and generates the response message. After receiving the customer-level quota request message, the execution module 1102 allocates a quota by using a customer as a granularity, and generates the response message. After receiving the customer-level charging message reported by the gateway, the execution module 1102 records one or more charging information units included in the charging message, and generates the response message.

The sending module 1103 is configured to send, to the gateway, the response message generated by the execution module.

All related content of the steps in Embodiment 1 and Embodiment 2 may be referred for the function descriptions of the corresponding function modules. Details are not described herein again.

The function module may be implemented in a form of hardware, or may be implemented in a form of a software function module. In a simple embodiment, a person skilled in the art may appreciate that the online charging system 1100 may use a form shown in FIG. 7. For example, the execution module 1102 in FIG. 11 may be implemented by the processor 701 in FIG. 7 by invoking the code in the memory 703. This embodiment of the present invention imposes no limitation thereon.

Figure 12:
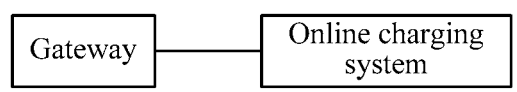
FIG. 12 is a schematic diagram of a system implementing sharing of a customer-level charging session according to an embodiment of the present invention.

Embodiment 10: System Embodiment Implementing Sharing of a Customer-Level Charging Session or a Customer Level CDR FIG. 12 shows a charging system implementing sharing of a customer-level charging session in an online charging mode in the foregoing embodiments. The system includes a gateway and an online charging system.

The gateway is configured to: send, to the online charging system, a request message for establishing a customer-level charging session, to request a customer-level quota from the online charging system; receive the customer-level quota granted by the online charging system; and report a customer-level charging message to the online charging system. The message includes an identifier of a customer and one or more charging information units.

The online charging system is configured to: receive the request message for establishing the customer-level charging session that is sent by the gateway, and record the customer-level charging session; receive a customer-level quota request message of a customer that is sent by the gateway, allocate a customer-level quota to the customer, and return a response message to the gateway; and receive a customer-level charging message sent by the gateway, and record one or more charging information units included in the message.

Figure 13:
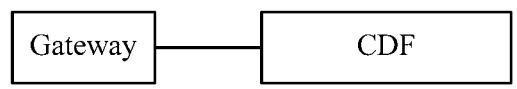
FIG. 13 is another schematic diagram of a system implementing sharing of a customer-level charging session according to an embodiment of the present invention.

FIG. 13 shows a charging system implementing sharing of a customer-level charging session in an offline charging mode based on an RF interface in the foregoing embodiments. The system includes a gateway and a CDF.

The gateway is configured to: send, to the CDF, a request message for establishing a customer-level charging session; and report a customer-level charging message to an online charging system. The message includes an identifier of a customer and one or more charging information units.

The CDF is configured to: receive the request message for establishing the customer-level charging session that is sent by the gateway, and record the customer-level charging session; and receive a customer-level charging message sent by the gateway, and record one or more charging information units included in the message.

Figure 14:
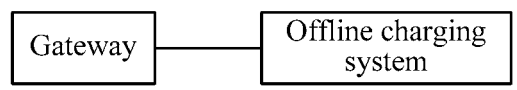
FIG. 14 is a schematic diagram of a system implementing sharing of a customer level CDR according to an embodiment of the present invention.

FIG. 14 shows a charging system implementing sharing of a CDR in an offline charging mode based on a CDR in the foregoing embodiments. The system includes a gateway and an offline charging system.

The gateway is configured to: record charging information of a plurality of devices in one customer level CDR, where the CDR includes an identifier of the customer and the plurality of charging information units; and send the customer level CDR to the offline charging system.

The offline charging system is configured to: receive a customer level CDR sent by the gateway, and record one or more charging information units of a customer included in the message.

All related content of the steps in Embodiment 1 to Embodiment 4 may be referred for the entities in the system. Details are not described herein again.

Method or algorithm steps described in combination with the content disclosed in the present invention may be implemented by hardware, or may be implemented by a processor by executing a software instruction. The software instruction may be formed by a corresponding software module. The software module may be located in a RAM memory, a flash memory, a ROM memory, an EPROM memory, an EEPROM memory, a register, a hard disk, a removable hard disk, a CD-ROM, or a storage medium of any other form known in the art. For example, a storage medium is coupled to a processor, so that the processor can read information from the storage medium or write information into the storage medium. Certainly, the storage medium may alternatively be a component of the processor. The processor and the storage medium may be located in the ASIC. In addition, the ASIC may be located in user equipment. Certainly, the processor and the storage medium may alternatively exist in the user equipment as discrete components.

A person skilled in the art should be aware that in the foregoing one or more examples, functions described in the present invention may be implemented by hardware, software, firmware, or any combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible by a general-purpose or dedicated computer.

The objectives, technical solutions, and beneficial effects of the present invention are further described in detail in the foregoing specific implementations. A person skilled in the art should understand that the foregoing descriptions are merely specific implementations of the present invention, but are not intended to limit the protection scope of the present invention. Any modification, equivalent replacement, improvement, or the like made based on the technical solutions of the present invention shall fall within the protection scope of the present invention. In the claims, "comprising" does not exclude another component or another step, and "a" or "one" does not exclude a case of multiple. A single processor or another unit may implement several functions enumerated in the claims. The fact that measures are recited in mutually different dependent claims does not indicate that a combination of these measures cannot bring better effects.

What is claimed is:

1. A charging method, comprising:
in response to a first device of a customer establishing a connection to a gateway, sending, by the gateway, a session establishment request message to an online charging system to establish a customer-level charging session with the online charging system, wherein the session establishment request message comprises an identifier of the customer;

sending, by the gateway in the customer-level charging session, a request message for requesting quota to the online charging system, wherein the request message for requesting quota comprises the identifier of the customer and a rating group;

receiving, by the gateway, a quota for the rating group that is delivered by the online charging system;

applying, by the gateway, the quota to devices of the customer that belong to the rating group, wherein the devices include a second device of the customer and a third device of the customer; and sending, by the gateway in the customer-level charging session, a message for reporting charging information of the customer, wherein the message for reporting the charging information of the customer comprises the identifier of the customer, charging information of the second device of the customer, and charging information of the third device of the customer, and wherein the second device of the customer and the third device of the customer have established connections to the gateway.

2. The method according to claim 1, further comprising:
removing the customer-level charging session when removing a last connection between a device of the customer and the gateway, wherein the removal of the last connection results in no connection between any device of the customer and the gateway.

3. The method according to claim 1, wherein charging information of each device of the customer is comprised in one corresponding charging information unit, and wherein each charging information unit further comprises an identifier of a corresponding device.

4. The method according to claim 1, further comprising:
receiving from the online charging system a trigger condition of reporting charging information; and
applying the trigger condition to the devices of the customer that belong to the rating group.

5. The method according to claim 4, further comprising:
before sending the message for reporting the charging information of the customer, detecting that the trigger condition is satisfied.

6. A charging method, comprising:
receiving, by an online charging system, a session establishment request message from a gateway when a first device of a customer establishing a connection to the gateway, wherein the session establishment request message comprises an identifier of the customer;
establishing, by the online charging system with the gateway, a customer-level charging session of the customer based on the identifier of the customer;
receiving, by the online charging system in the customer-level charging session, a request message for requesting quota from the gateway, wherein the request message for requesting quota comprises the identifier of the customer and a rating group;
delivering, by the online charging system, a quota for the rating group to the gateway, wherein the quota for the rating group is to be applied to devices of the customer that belong to the rating group, and wherein the devices include a second device of the customer and a third device of the customer; and
receiving, by the online charging system in the customer-level charging session, a message for reporting charging information of the customer from the gateway, wherein the message for reporting charging information of the customer comprises the identifier of the customer, charging information of the second device of the customer, and charging information of the third device of the customer.

7. The method according to claim 6, wherein charging information of each device of the customer is comprised in one corresponding charging information unit, and wherein each charging information unit further comprises an identifier of a corresponding device.

8. The method according to claim 6, further comprising:
sending a trigger condition of reporting charging information to the gateway, wherein the trigger condition of reporting charging information is to be applied to the devices of the customer that belong to the rating group.

9. A gateway, comprising:
at least one processor; and
one or more memories coupled to the at least one processor and storing programming instructions for execution by the at least one processor to perform operations comprising:
in response to a first device of a customer establishing a connection to a gateway, sending a session establishment request message to an online charging system to establish a customer-level charging session with the online charging system, wherein the session establishment request message comprises an identifier of the customer;
sending, in the customer-level charging session, a request message for requesting quota to the online charging system, wherein the request message for requesting quota comprises the identifier of the customer and a rating group;
receiving a quota for the rating group that is delivered by the online charging system;
applying the quota to devices of the customer that belong to the rating group, wherein the devices include a second device of the customer and a third device of the customer; and
sending, in the customer-level charging session, a message for reporting charging information of the customer, wherein the message for reporting the charging information of the customer comprises the identifier of the customer, charging information of the second device of the customer, and charging information of the third device of the customer, and wherein the second device of the customer and the third device of the customer have established connections to the gateway.

10. The gateway according to claim 9, the operations further comprising:
removing the customer-level charging session when removing a last connection between a device of the customer and the gateway, wherein the removal of the last connection results in no connection between any device of the customer and the gateway.

11. The gateway according to claim 9, wherein charging information of each device of the customer is comprised in one corresponding charging information unit, and wherein each charging information unit further comprises an identifier of a corresponding device.

12. The gateway according to claim 9, the operations further comprising:
receiving from the online charging system a trigger condition of reporting charging information; and
applying the trigger condition to the devices of the customer that belong to the rating group.

13. The gateway according to claim 12, the operations further comprising:
before sending the message for reporting the charging information of the customer, detecting that the trigger condition is satisfied.

* * * * *